US012722755B1

(12) United States Patent
Tate

(10) Patent No.: US 12,722,755 B1
(45) Date of Patent: Sep. 1, 2026

(54) SYSTEMS AND METHODS FOR DYNAMIC ADJUSTMENT OF DEPTH INDICATORS ON MARINE VESSEL NAVIGATIONAL CHARTS

(71) Applicant: Brunswick Corporation, Mettawa, IL (US)

(72) Inventor: Brandon L. Tate, Walnut Hill, IL (US)

(73) Assignee: Brunswick Corporation, Mettawa, IL (US)

( * ) Notice: Subject to any disclaimer, the term of this patent is extended or adjusted under 35 U.S.C. 154(b) by 162 days.

(21) Appl. No.: 18/617,264

(22) Filed: Mar. 26, 2024

(51) Int. Cl.
*B63B 49/00* (2006.01)
*B63B 79/15* (2020.01)
*G01C 21/00* (2006.01)
*G01C 21/20* (2006.01)

(52) U.S. Cl.
CPC .............. *B63B 49/00* (2013.01); *B63B 79/15* (2020.01); *G01C 21/005* (2013.01); *G01C 21/203* (2013.01); *B63B 2213/02* (2013.01)

(58) Field of Classification Search
CPC ............... G01S 15/895; G01S 15/8929; G01S 15/8934; G01S 15/8945; G01S 15/1934; B63B 49/00; B63B 79/15; G01C 21/003; G01C 21/005
USPC .......................................................... 701/445
See application file for complete search history.

(56) References Cited

U.S. PATENT DOCUMENTS 4,697,253 A * 9/1987 Lind ...................... G01S 15/10 367/12
9,213,722 B2 12/2015 Lauenstein
9,329,267 B2 5/2016 Iverson
9,829,573 B2 11/2017 Laster
9,939,519 B2 4/2018 Bornsen
(Continued)

FOREIGN PATENT DOCUMENTS

CN 111536951 A * 8/2020 ............. G01F 25/20
CN 111948658 A * 11/2020 ........... G06V 10/751
(Continued)

OTHER PUBLICATIONS

An English-translated version of CN111536951A (Aug. 14, 2020) by Liu Liang et al (Year: 2020).*
(Continued)

*Primary Examiner* — Cuong H Nguyen
(74) *Attorney, Agent, or Firm* — Andrus Intellectual Property Law, LLP

(57) ABSTRACT

A navigation system for a marine vessel is provided. The navigation system includes a locating system configured to locate a global position of a center of rotation of the marine vessel and a transducer configured to sense water depth measurements. The transducer is positioned a longitudinal distance and a lateral distance from the center of rotation. The navigation system further includes a controller configured to receive the water depth measurements and to determine an adjusted transducer position relative to the center of rotation based on the longitudinal distance, the lateral distance, and at least one of pitch or roll movements of the marine vessel. The controller is further configured to correct the water depth measurements based on the pitch or roll movements of the marine vessel and to determine a chart error correction value based on the adjusted transducer position and the corrected water depth measurements.

20 Claims, 8 Drawing Sheets

(56) References Cited

U.S. PATENT DOCUMENTS

| | | | |
|---|---|---|---|
| 10,061,025 | B2 | 8/2018 | Kirmani |
| 10,371,816 | B2 | 8/2019 | Seifert |
| 11,022,441 | B2 | 6/2021 | Clark |
| 2022/0355908 | A1 | 11/2022 | Okuda |
| 2023/0195118 | A1 | 6/2023 | Singh |

FOREIGN PATENT DOCUMENTS

| | | | | | |
|---|---|---|---|---|---|
| CN | 114397664 | A | * | 4/2022 | ............. G01S 15/08 |
| CN | 116482335 | A | * | 7/2023 | ............. G01N 33/24 |
| CN | 113093159 | B | * | 12/2023 | ......... G01S 7/52004 |
| CN | 117906711 | A | * | 4/2024 | ............. B64U 20/80 |
| GB | 2474715 | A | * | 4/2011 | ........... G01C 13/008 |
| JP | 2009250780 | A | * | 10/2009 | |
| KR | 101035386 | B1 | * | 5/2011 | ........... G01V 11/002 |
| KR | 101249508 | B1 | * | 4/2013 | ............. G01S 15/58 |

OTHER PUBLICATIONS

You, Qiang, et al. "The scheme and application of dynamic monitoring system for ships passing through the Three Gorges ship lift chamber." International Conference on Smart Transportation and City Engineering (STCE 2024). vol. 13575. SPIE, 2025. (Year: 2025).*

Mankina, V., Araújo, A. P., Guerra, R., Clua, E. W., Cernicchiaro, C., Gonçalves, L. M., & Distante, C. (2025). AI-Based Autonomous Sailboat Navigation: A Review. Journal of Field Robotics. (Year: 2025).*

An English-translated version of CN111948658A (Nov. 17, 2020) by Gao et al (Year: 2020).*

An English-translated version of CN108225268B (Aug. 21, 2020) by Dai Xiaoshu et al (Year: 2020).*

An English-translated version of JPH07198844A by Kozuo et al (Year: 1995).*

Wang, Tuo, Teresa A. Kent, and Sarah Bergbreiter. "Design of whisker-inspired sensors for multi-directional hydrodynamic sensing." IEEE Sensors Journal (2025). (Year: 2025).*

Chu, Yunze, et al. "Structural design and adaptive tracking control of automatic welding robot for liquefied natural gas containment system." Discover Applied Sciences 6.3 (2024): 118. (Year: 2024).*

Warren, Danielle, et al. "2025 NOAA Ship Okeanos Explorer Mapping Systems Readiness Report." (2025). (Year: 2025).*

Grasberger, Jeff, et al. "Hydrodynamic characterization of the coastal pioneer array ocean observing system." Journal of Ocean Engineering and Marine Energy 11.3 (2025): 655-677. (Year: 2025).*

* cited by examiner

SYSTEMS AND METHODS FOR DYNAMIC ADJUSTMENT OF DEPTH INDICATORS ON MARINE VESSEL NAVIGATIONAL CHARTS

FIELD

The present disclosure relates to navigation systems for marine vessels, and more specifically, to systems and methods for dynamically adjusting navigational depth charts using sonar transducer depth measurements.

BACKGROUND

U.S. Pat. No. 9,329,267 is directed to methods and sonar system for displaying a nautical chart and for adjusting depth indicators on the chart based on a calculated offset between the actual water level and the standard water level on which the chart is based. The offset is based on sonar soundings compared to depths indicated by the chart. The sonar system's processor automatically adjusts the chart's depth indicators to reflect the offset.

U.S. Pat. No. 10,371,816 is directed to systems and methods for dynamically updating contour maps. A first water level for a body of water may be determined by a computing device. A location within the body of water may be identified. A second water level relating to the identified location within the body of water may be determined, and the second water level and the first water level may be compared. Upon comparing the first and second water levels, a contour map for the body of water may be automatically updated.

The above patents are hereby incorporated by reference in their entireties.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a navigation system for a marine vessel includes a locating system configured to locate a global position of a center of rotation of the marine vessel and a transducer configured to sense at least one water depth measurement below the marine vessel. The transducer is positioned at least one of a longitudinal transducer distance and a lateral transducer distance from the center of rotation. The navigation system further includes one or more controllers configured to receive the at least one water depth measurement from the transducer and determine an adjusted transducer position of the transducer relative to the center of rotation based on the at least one of the longitudinal transducer distance and the lateral transducer distance, and at least one of pitch or roll movements of the marine vessel. The one or more controllers are further configured to correct the at least one water depth measurement from the transducer based on the at least one of the pitch or roll movements of the marine vessel and determine a chart error correction value based on the adjusted transducer position and the at least one corrected water depth measurement.

According to another implementation of the present disclosure, a method for error correcting a depth chart used for navigation of a marine vessel is provided. The method includes receiving at least one water depth measurement from a transducer. The transducer is positioned at least one of a longitudinal transducer distance and a lateral transducer distance from a center of rotation of the marine vessel. The method further includes determining an adjusted transducer position of the transducer relative to the center of rotation based on the at least one of the longitudinal transducer distance and the lateral transducer distance, and at least one of pitch or roll movements of the marine vessel, correcting the at least one water depth measurement from the transducer based on the at least one of the pitch or roll movements of the marine vessel, and determining a chart error correction value based on the adjusted transducer position and the at least one corrected water depth measurement.

BRIEF DESCRIPTION OF THE DRAWINGS

The present disclosure is described with reference to the following Figures. The same numbers are used throughout the Figures to reference like features and like components.

DETAILED DESCRIPTION

Although depth charts providing estimates of water depths below a marine vessel can be critical to an operator in the safe navigation of the marine vessel, the data displayed on such charts is often inaccurate. Water levels may fluctuate for a variety of reasons, include tides, wind, water releases due to construction or power production, and weather events and conditions (e.g., rainfall, hurricanes). Although some bodies of water publish water levels or provide depth markers that may be utilized to error correct depth charts by manually entering a depth adjust, such aids are not universally provided, and manual input may be burdensome. In addition, although some depth chart systems provide a tide chart for regions affected by tides, chart adjustments due to tides may not be provided in real time.

The present inventor has therefore recognized that methods for calculating the error between chart depth data and actual measured depths below a marine vessel would be useful. The systems and methods of the present disclosure therefore estimate the position of a sonar transducer utilized for measuring water depths relative to pitch and roll axes of the marine vessel. By combining depth measurements from the known transducer position with pitch, roll, and heave measurements experienced by the vessel as determined by a navigation system, a real time error correction value for the depth measurements can be determined and displayed on depth charts.

Figure 1:
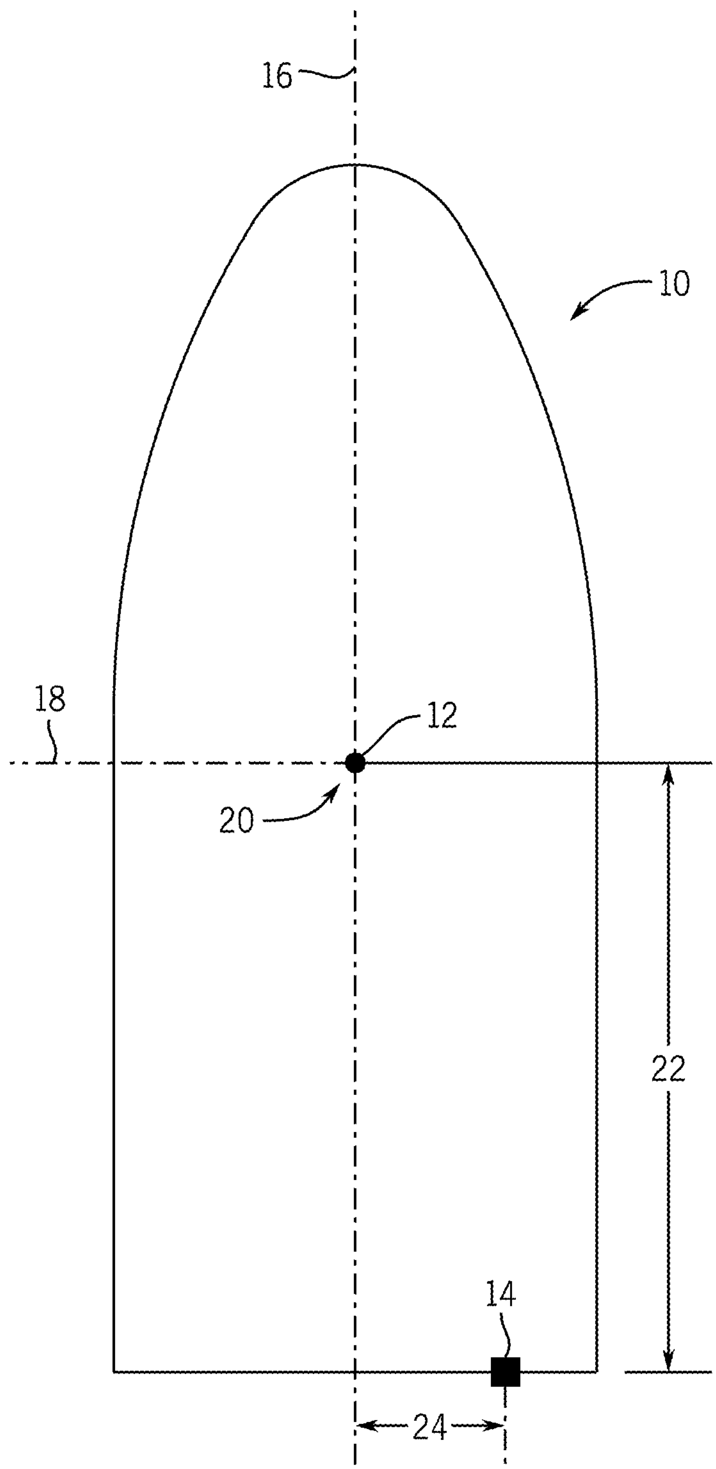
FIG. 1 is a schematic top view representation of a marine vessel having a sonar transducer utilized for depth measurements.

FIG. 1 depicts a schematic top view representation of a marine vessel 10 having a center of rotation 12. Accordingly, longitudinal axis 16, lateral axis 18, and vertical axis 20 are shown to extend through the center of rotation 12 such that roll movements of the vessel 10 are rotations about the longitudinal axis 16, pitch movements of the vessel 10 are rotations about the lateral axis 18, and yaw movements of the vessel 10 are rotations about the vertical axis 20. The vessel 10 is further shown to include a sonar transducer device 14 that is positioned a longitudinal distance 22 and a lateral distance 24 from the center of rotation 12. In an exemplary embodiment, the transducer device 14 is installed on an exterior surface of the transom of the vessel 10. In other embodiments, the transducer device 14 could be installed on an interior of the hull of the vessel 10 (e.g., an "in-hull" transducer) or in a hole formed in the hull (e.g., a "thru-hull" transducer). As described in further detail below, the sonar transducer 14 is configured to transmit a sonar signal outwardly through the water, and to receive a reflected signal that bounces back to the transducer after encountering an object (e.g., the seabed, a log, a fish). Based upon the time it takes to receive the reflected signal, the depth of the object can be determined.

Figure 2:
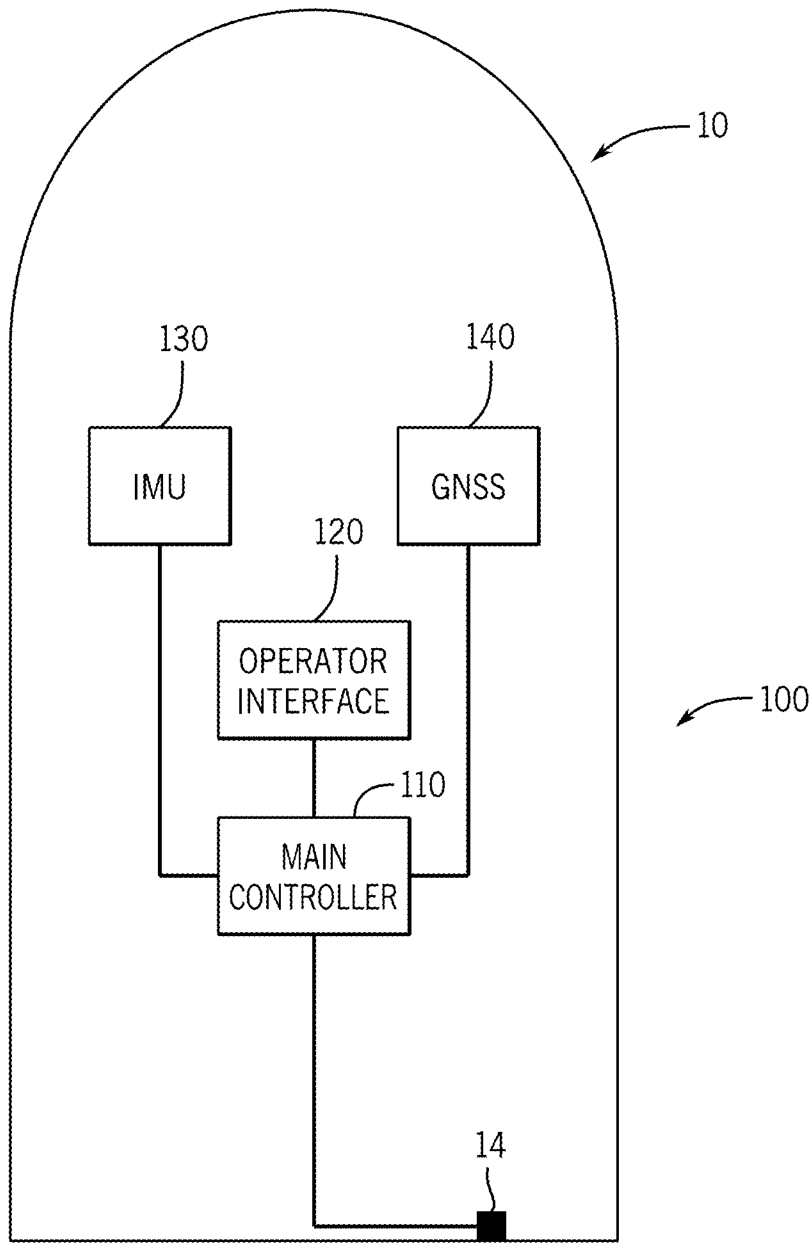
FIG. 2 illustrates a block diagram of a navigation system for a marine vessel utilizing a sonar transducer.

FIG. 2 depicts a block diagram of the marine vessel 10 having a navigation system 100. The navigation system 100 is shown to include a main controller 110 that receives inputs from and/or issues commands to an operator interface 120, an inertial measurement unit (IMU) 130, a global navigation satellite system (GNSS) 140, and the sonar transducer 14. Although the main controller 110 is depicted as a single device, in other implementations, the functions of the main controller 110 may be distributed over multiple controllers. The operator interface 120 may be any suitable display device that permits an operator to view a depth chart (see FIG. 3 below). The IMU 130 may have a solid state, rate gyro electronic compass that indicates the vessel heading and solid state accelerometers and angular rate sensors that sense the vessel's attitude and rate of turn. Specifically, the IMU 130 may include a 3-axis accelerometer, a 3-axis gyroscope, and a 3-axis magnetometer, and measure the acceleration, orientation, and direction of the marine vessel 10 in nine degrees of freedom. The GNSS 140 may include an antenna that is configured to receive satellite signals from a relevant satellite (e.g., a GPS satellite, a GLONASS satellite) that are processed at a receiver or processing unit to determine a global position of the marine vessel 10. In an exemplary implementation, the position of the GNSS antenna relative to the center of rotation 12 of the marine vessel 10 may be known by the system such that the global position of the center of rotation 12 can be determined.

The arrangement of the navigation system 100 depicted in FIG. 2 is merely exemplary, and other implementations of the navigation system 100 may include different arrangements within the scope of the present disclosure. For example, the navigation system 100 could include an altitude heading reference system (AHRS) in place of the IMU 130 and the GNSS 140. An AHRS provides 3D orientation of the marine vessel 10 by integrating gyroscopic measurements, accelerometer data, and magnetometer data through the combination of an IMU and GPS. In still further embodiments, the navigation system 100 could include an inertial navigation system (INS) which includes all of the components of an AHRS and further employs a Kalman filter (or another estimation algorithm) and sensor fusion techniques to improve the accuracy of the output regarding the vessel's position and movements.

Figure 3:
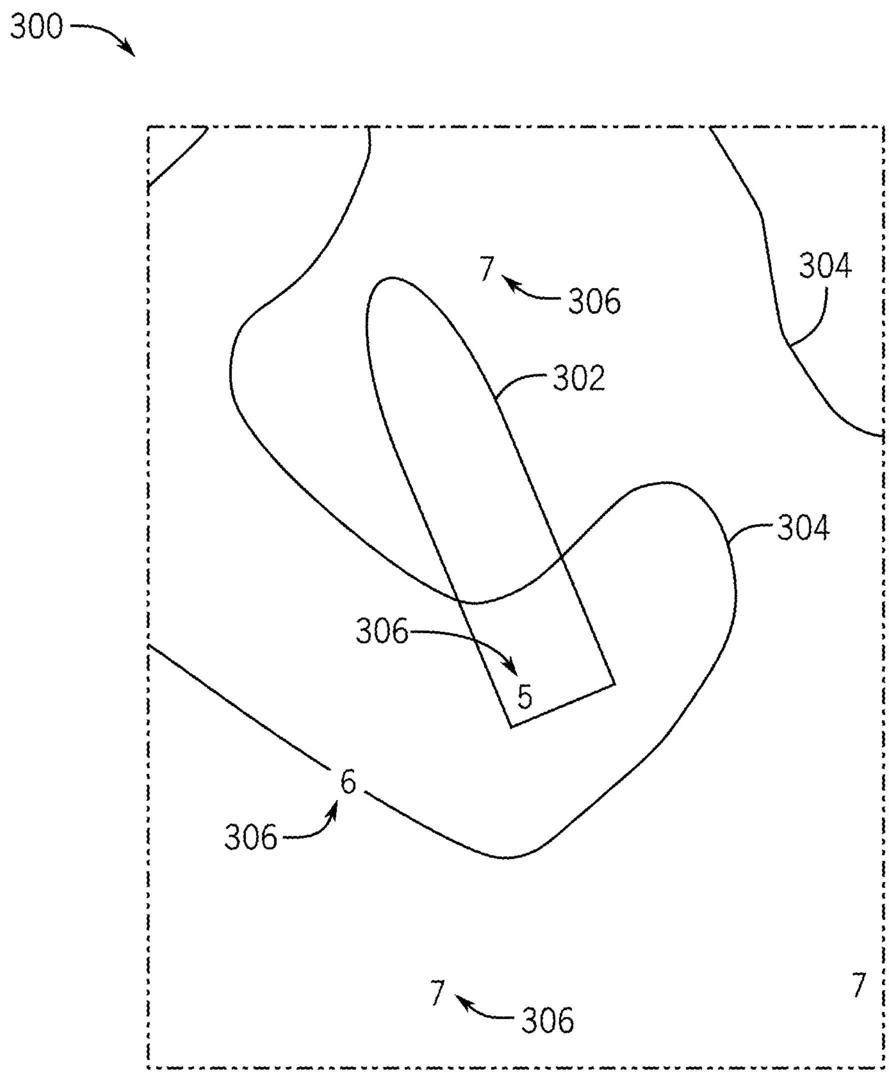
FIG. 3 illustrates an exemplary depth chart that may be displayed by the navigation system of the marine vessel.

FIG. 3 depicts a depth/bathymetric chart 300 that may be displayed on the operator interface 120. In an exemplary implementation, chart 300 may be generated by the main controller 110 for display on the operator interface 120 based on data collected by the transducer device 14 and/or stored historical data that is downloaded from the internet or other historical data sources. Chart 300 is shown to include an outline representation 302 of the marine vessel 10, as well as several contour lines 304, also known as isobaths, which connect points of equal depth relative to a reference depth or datum. The depth measurements are labeled as depth indicators 306 on both the contour lines 304 and the areas bounded within the contour lines 304. For example, as shown in FIG. 3, the vessel 10 may be positioned spanning depths of 5 meters (e.g., the stern of the vessel), 6 meters (e.g., the contour line 304 crossing the middle of the vessel) and 7 meters (e.g., the bow of the vessel). Accordingly, the contour spacing between adjacent contour lines 304 may be 2 meters. Such spacing is merely exemplary and may depend on the characteristics of the seabed below the marine vessel 10 and the operator's desired chart depth resolution.

Figure 4:
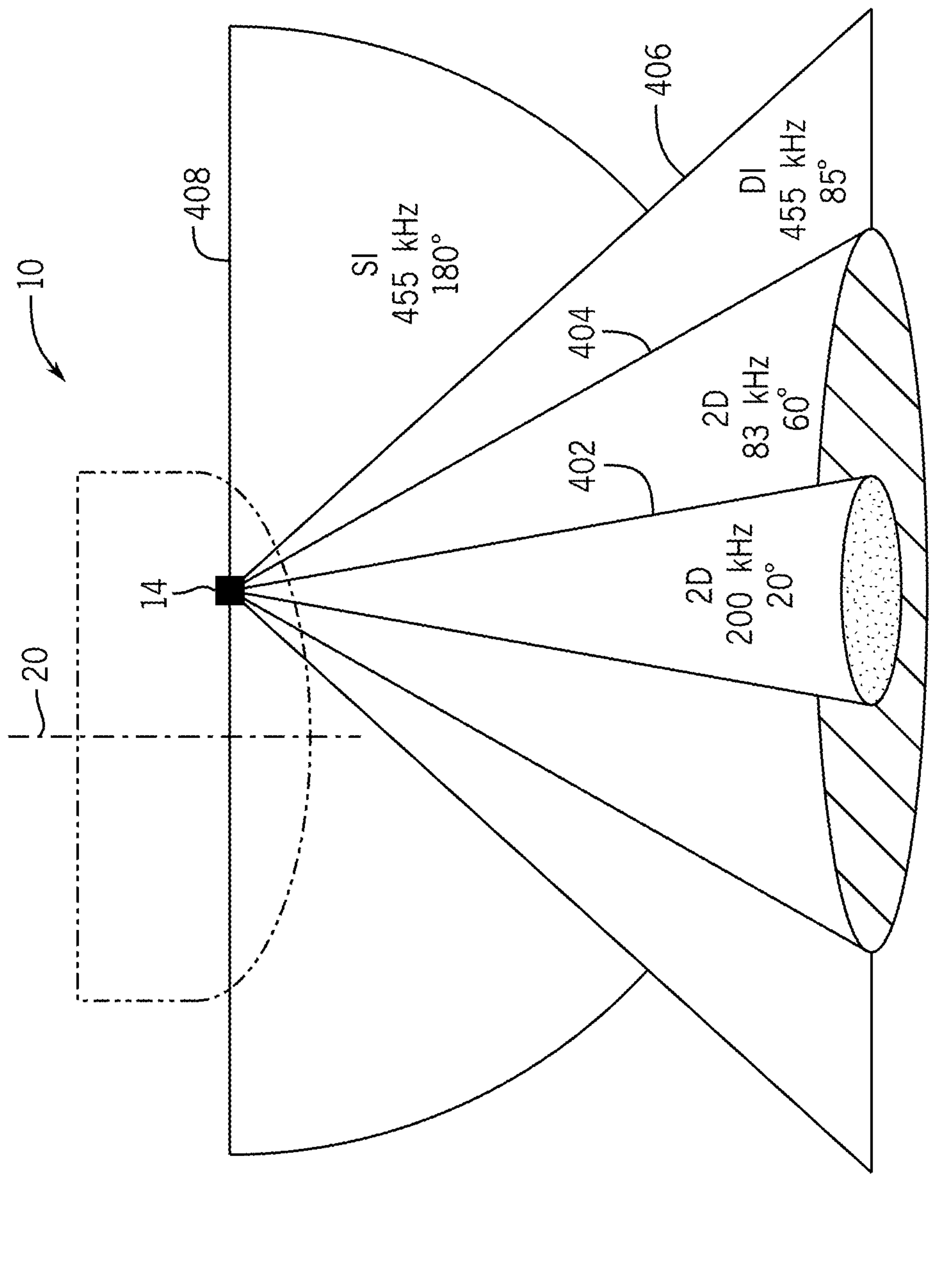
FIG. 4 illustrates various beam measurement areas that may be emitted by a sonar transducer utilized for depth measurements.

Turning now to FIG. 4, various exemplary beam measurement areas that may be emitted by the sonar transducer 14 are depicted. Areas 402, 404, and 406 are representative of the measurement areas of down-facing sonar transducers, while area 408 is representative of the measurement area of a side imaging sonar transducer. Down-facing sonar transducers may be either 2D imaging-type or down imaging-type. 2D imaging-type transducers emit lower frequency sonar signals in a round cone-shaped pattern (e.g., areas 402 and 404) with the angle of the beam and the size of the cone dependent on the frequency that is output from the transducer. The use of lower frequencies than down imaging transducers ensures that 2D transducers can image greater depths than down imaging transducers.

As further shown in FIG. 4, relatively higher frequency 2D imaging signals (e.g., 200 kHz, associated with area 402 having a cone angle of 20°) are configured to image a smaller area of the seabed than relatively lower frequency 2D imaging signals (e.g., 83 kHz, associated with area 404 having a cone angle of 60°). Down imaging transducers emit sonar signals in a thin, high-frequency beam (e.g., 455 kHz, associated with area 406) that extends from the transducer 14 in a fan-shaped pattern (e.g., at an angle of 85° from the transducer 14) that provides better resolution than 2D transducers. Side imaging sonar transducers similarly emit sonar signals in a thin fan-shaped high-frequency beam (e.g., 455 kHz, associated with area 408) that extends from the transducer 14 in a semi-circular pattern (e.g., at an angle of 180° from the transducer 14).

Figure 5:
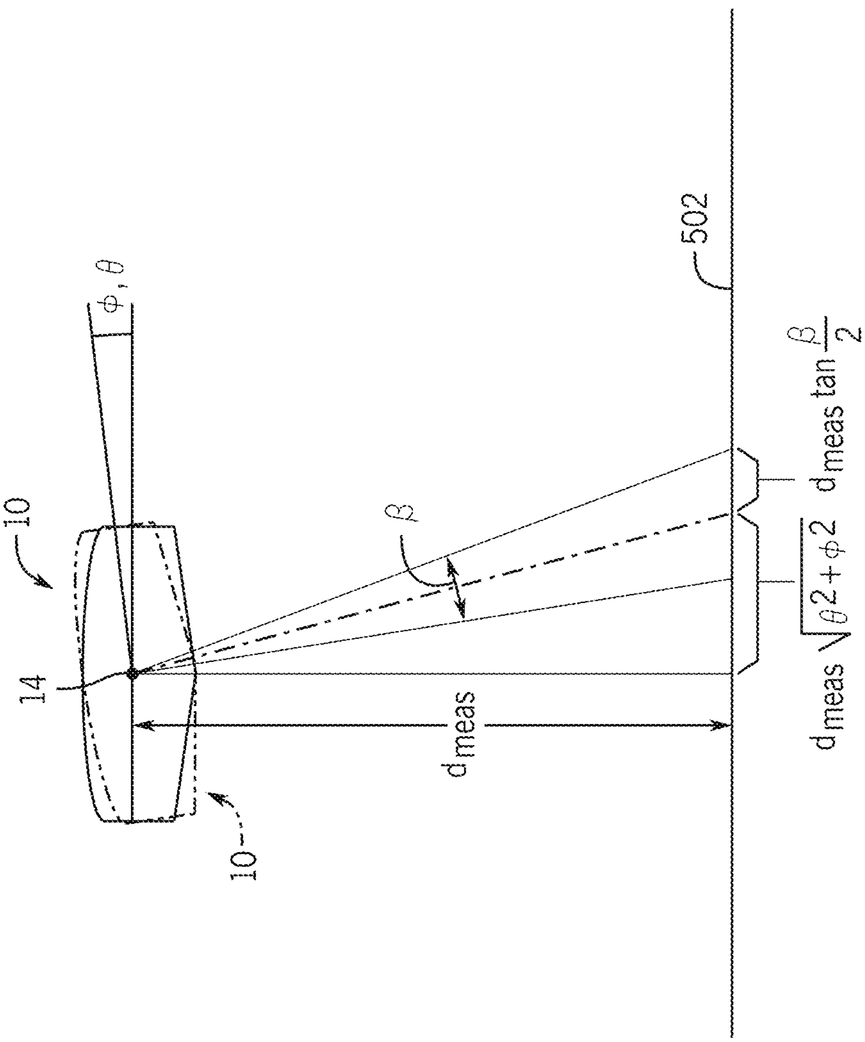
FIG. 5 is a cross-sectional schematic representation of the sonar transducer beam utilized for depth measurements.

FIG. 5 is a cross-sectional schematic representation of a conical sonar transducer beam utilized for depth measurements. Specifically, FIG. 5 may depict either a rear cross-sectional view of the vessel 10 as bisected by the lateral axis 18, such that the depicted tilt angle of the vessel shown in the image is a roll angle $\varphi$ representative of roll movements experienced by the vessel, or it may depict a side cross-sectional view of the vessel 10 as bisected by the longitudinal axis 16, such that the depicted tilt angle of the vessel shown in the image is a pitch angle $\theta$ representative of pitch movements experienced by the vessel. Whether via pitch or roll movements, such movements cause the transducer beam emitted by the transducer 14 to tilt such that the center of the beam is no longer perpendicular to the lakebed/seabed 502.

Depending on the cone angle β of the measurement area of the transducer 14, the footprint diameter of the sonar transducer beam $D_{sonar}$ based on the current sonar depth measurement $d_{meas}$ can be determined by the following equation:

$$D_{sonar} = 2d_{meas}\tan\frac{\beta}{2}$$

Such a relationship is valid for narrow beam sonar signals (e.g., β≤20°). The distance the transducer beam moves due to pitch and roll of the vessel $D_{pitch/roll}$ can be determined by the following equation:

$$D_{pitch/roll} \approx 2d_{meas}\sqrt{\theta^2 + \varphi^2}$$

In this equation, θ is the pitch angle in radians, and φ is the roll angle in radians. The equation is a small angle approximation for sine which has less than 1% error for pitch and/or roll angles less than 10°. Once $D_{sonar}$ and $D_{pitch/roll}$ have been calculated, a measurement area diameter $D_{measurement}$ of the transducer 14 can be calculated by adding the footprint diameter of the sonar transducer beam $D_{sonar}$ to the distance the transducer beam moves due to pitch and roll of the vessel $D_{pitch/roll}$:

$$D_{measurement} = D_{sonar} + D_{pitch/roll}$$

As described in further detail below with reference to FIGS. 7 and 8, when the measurement area diameter $D_{measurement}$ of the transducer is known, the main controller 110 can utilized this value to apply selection criteria to determine whether a measurement location is suitable for calculating a chart error correction value in order to display a corrected depth chart. The measurement area diameter $D_{measurement}$ may further be utilized to calculate the longitudinal and/or lateral distances 22, 24 of the transducer 14 from the center of rotation 12 of the vessel 10 (see FIG. 8).

Figure 6:
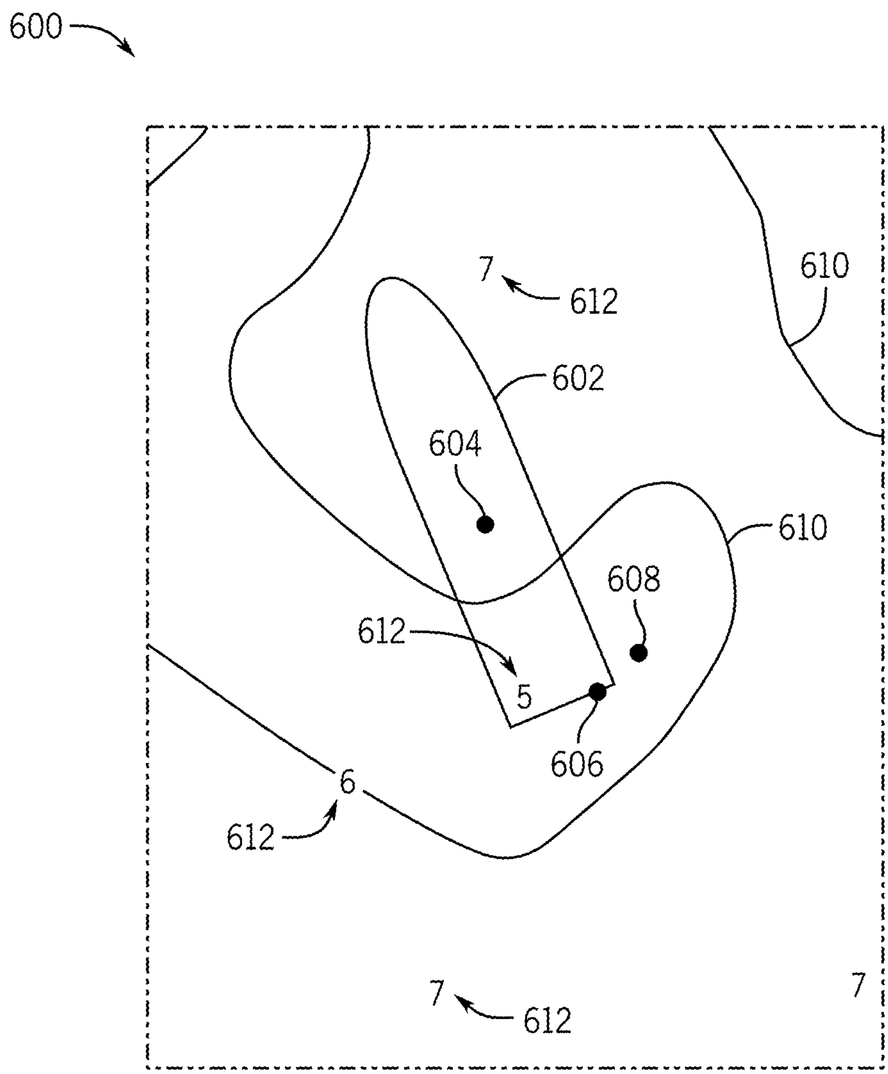
FIG. 6 illustrates an exemplary corrected depth chart that may be displayed by the navigation system of the marine vessel.

FIG. 6 displays another exemplary depth/bathymetric chart 600 that may be displayed on the operator interface 120. As was depicted in FIG. 3, the chart 600 is shown to include an outline of the marine vessel 602 with contour lines/isobaths 610 used to connect points of equal depth relative to a reference point or datum. Depth measurements are labeled as depth indicators 612. In addition, FIG. 6 additionally depicts the location of the center of rotation 604 of the vessel. This location may be determined by the GNSS 140, as the position of the GNSS antenna relative to the center of rotation is known. Transducer position 606 is representative of the physical mounting location of the transducer 14. In order to determine the transducer position 606, a longitudinal and/or lateral offset ($d_{ion}$ and $d_{lat}$) for the transducer 14 from the center of rotation 604 must be calculated, which is described in further detail below with reference to FIG. 8. FIG. 6 further depicts a pitch/roll corrected position 608 which is representative of location where the depth of the seabed is measured by the transducer 14 due to pitch and/or roll movements of the vessel.

Figure 7:
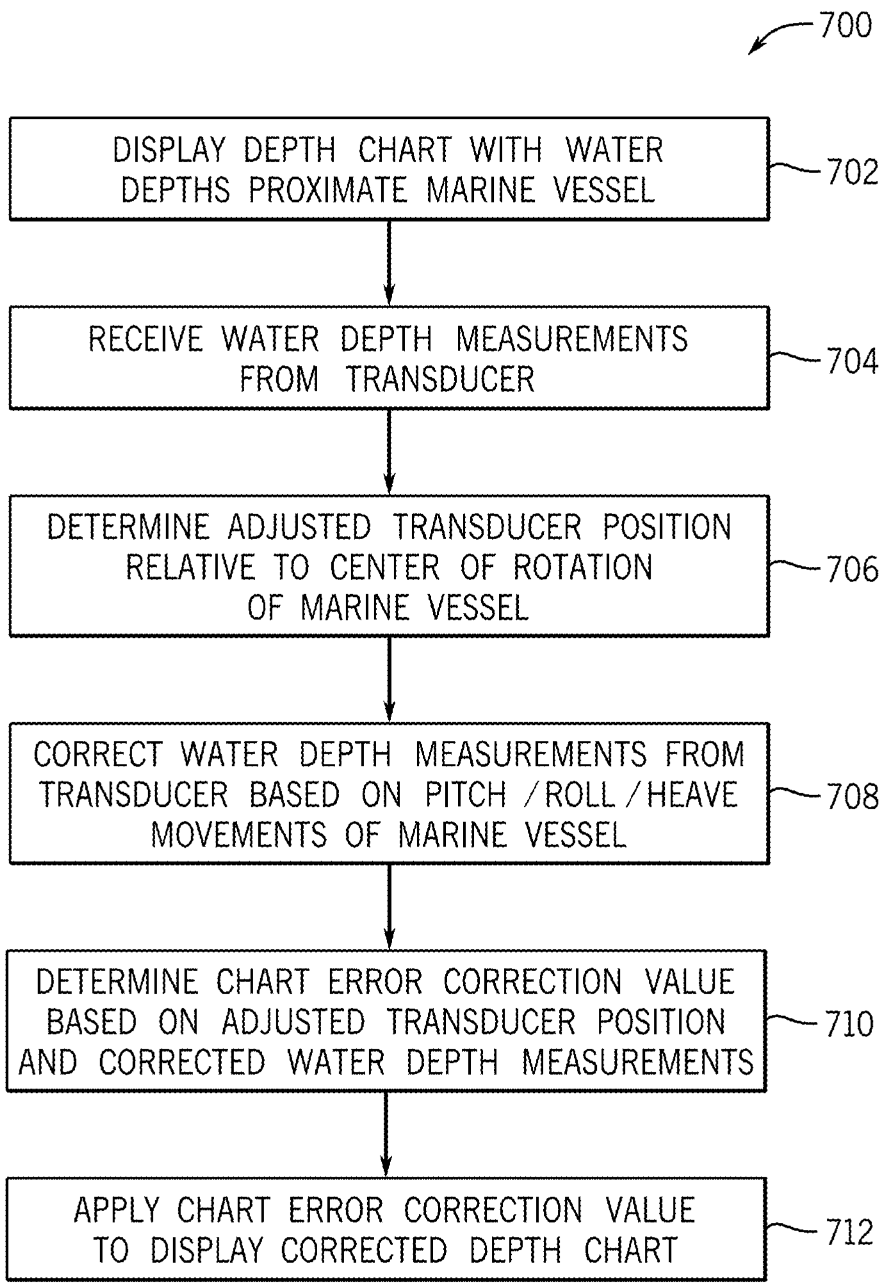
FIG. 7 illustrates an exemplary method for determining a chart error correction value using the navigation system.

Turning now to FIG. 7, a method 700 for determining a chart error correction value using the navigation system 100 is depicted. In an exemplary implementation, method 700 is performed predominantly by the main controller 110. Method 700 commences at step 702, as the main controller 110 generates and displays a depth chart (e.g., chart 300, see FIG. 3) on the operator interface 120 with water depths proximate the marine vessel 10. As described above, the water depths displayed on the depth chart may be historical data downloaded from the internet, and/or depth measurements from the transducer 14. At step 704, the main controller 110 further receives water depth measurements from the transducer 14, and at step 706, the main controller 110 determines an adjusted transducer position (e.g., transducer position 606, see FIG. 6) for the transducer 14 based on longitudinal and/or lateral distances 22, 24 of the transducer 14 from the center of rotation 12 of the vessel 10. A method for calculating these distances is included below with reference to FIG. 8. Once the position of the transducer 14 relative to the center of rotation 12 is known, the depth measurements from the transducer 14 can be corrected based on the pitch, roll, and/or heave movements of the vessel 10 as determined by the IMU 130. For example, returning to FIG. 6, although the transducer position 606 may be representative of the physical location of the transducer 14 on the vessel 10, after applying a pitch, roll, and/or heave correction at step 708, the depth measurement location may be represented by location 608, which is outside the footprint of the marine vessel 602.

Method 700 continues at step 710, as the main controller 110 calculates a chart error correction value based on the adjusted transducer position and the corrected water depth measurements. Difference values between the displayed chart data at a location and the adjusted measured data at that location can be utilized as input into a Kalman filter or regression algorithm to output a single chart error correction value that is calculated continuously and applied across a displayed section of a displayed depth chart. Method 700 concludes at step 712, as the main controller 110 applies the chart error correction value calculated at step 710 to the depth chart (e.g., chart 300, see FIG. 3) displayed on the operator interface 120.

In an exemplary implementation, the main controller 110 may reject various locations as unsuitable from use as locations where the depth measurements are utilized as input to the Kalman filter or regression algorithm used to calculate the chart error correction value. For example, locations where seaweed or grass is present below the vessel may not be suitable for use as input to determine a chart error correction value due to the inaccuracy of the depth measurements at these locations. In order to determine whether a depth measurement location is suitable, the main controller 110 may employ location selection criteria based on whether a ratio of the beam measurement area $D_{measurement}$ to a depth contour spacing of the depth chart exceeds a ratio threshold, or whether a bathymetric slope estimate for the location is less than a slope threshold. Further details regarding application of the location selection criteria are included below with reference to FIG. 8.

Figure 8:
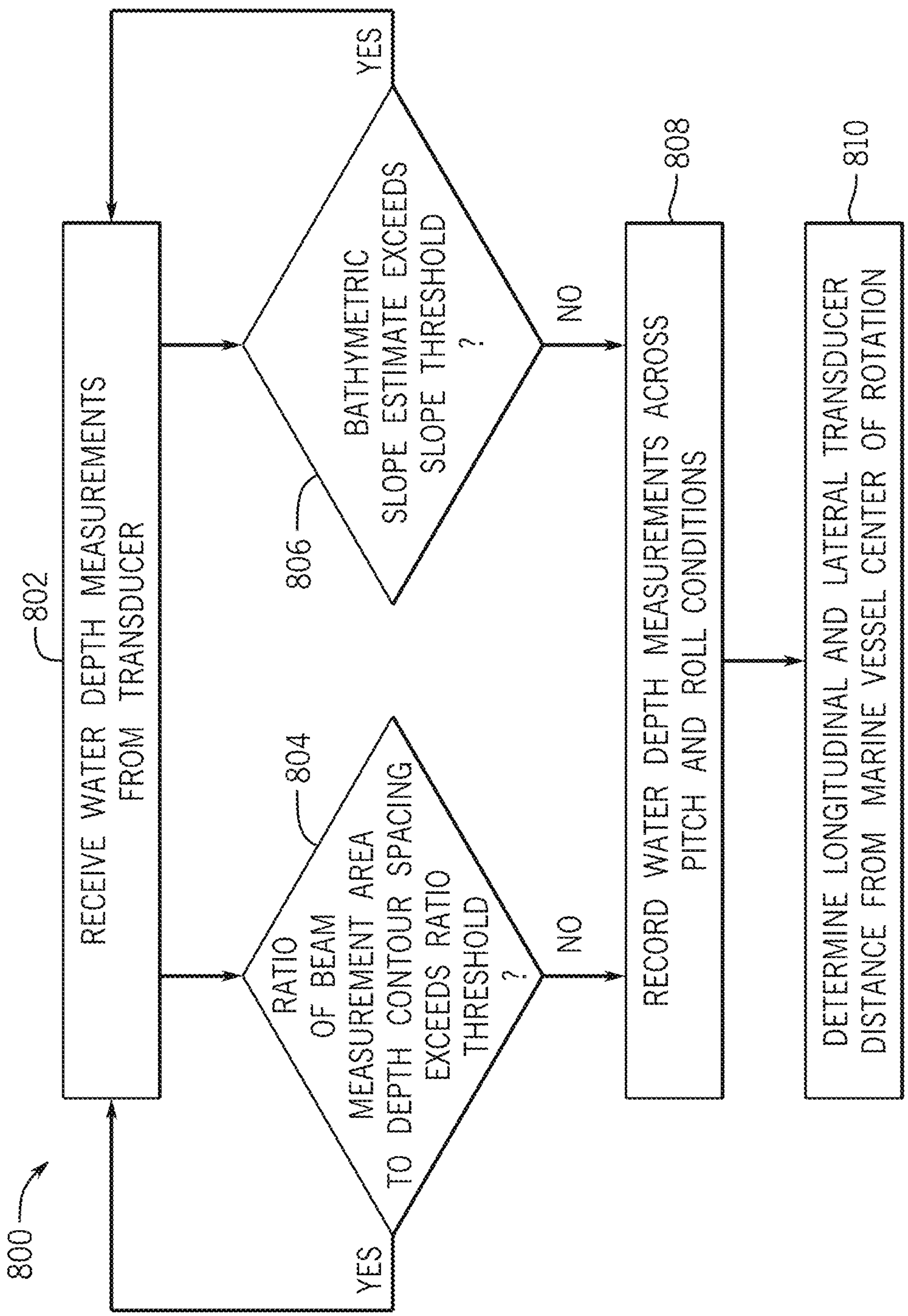
FIG. 8 illustrates an exemplary method for locating a sonar transducer relative to a center of rotation of the marine vessel.

Referring now to FIG. 8, a method 800 for determining a longitudinal distance (e.g., distance 22, see FIG. 1) and/or lateral distance (e.g., distance 24, see FIG. 1) of the transducer 14 from the center of gravity 12 of the marine vessel 10 is shown. In an exemplary implementation, the transducer 14 is a 2D imaging-type with a measurement cone angle (B, see FIG. 5) of 20° or less, which is generally standard for a transducer operating at a frequency of 200 kHz or less. The method 800 may be predominantly performed by the main controller 110 in communication with the transducer 14; however, in other implementations, the steps of method 800 may be performed by other controllers in addition to the main controller 110.

Method 800 commences at step 802, as the main controller 110 receives multiple depth measurements from the transducer 14. In an exemplary implementation, such measurements would be received when the vessel 10 is not operating on plane, and when the vessel 10 is not operating in a mode which would render the sensor measurements from the transducer 14 unusable. For example, if any of the engines on the marine vessel 10 are operating in reverse, as they often do during operation of the vessel 10 in a station-keeping mode, the main controller 110 may reject receipt of depth measurements from the transducer 14, as engines operating in reverse may disturb the water around the transducer 14 and render the measurements inaccurate.

Continuing with steps 804 and 806, the main controller 110 may employ two exemplary location selection criteria to determine whether a measurement location is suitable for longitudinal and/or latitudinal distance calculation. One exemplary criteria is employed at step 804, as the main controller 110 determines whether a ratio of a beam measurement area $D_{measurement}$ to a depth contour spacing exceeds a ratio threshold. As described above with reference to FIG. 5, the equation for the beam measurement area includes an estimate of both the predicted footprint diameter of the transducer beam $D_{sonar}$ added to the expected distance to be moved due to pitch and/or roll movements $D_{pitch/roll}$. For example, at a water depth of 10 m, a transducer measurement cone angle β of 20°, and wake inducing a roll angle φ of 5°, $D_{sonar}$ is approximately 3.5 m, and $D_{pitch/roll}$ is approximately 1.75 m, resulting in $D_{measurement}$ of approximately 5.25 m. If the ratio of the beam measurement area $D_{measurement}$ to the depth contour spacing exceeds a ratio threshold (e.g., 1.0 or more), method 800 reverts to step 802, and the main controller 110 repeats the calculations at a different location. Use of the ratio threshold value ensures that the depth change across the beam measurement area is not so large as to introduce unacceptable error into the estimations. For example, returning to the example above, assuming a contour spacing of 5 m, with a change of 1 m between contours, the ratio of $D_{measurement}$ to the depth contour spacing is 1.05, meaning that the calculations should be repeated at a different location. If, however, the ratio threshold is not exceeded, method 800 proceeds to step 808.

As an alternative the beam measurement area calculations of step 804, the main controller 110 may employ an alternate location selection criteria at step 806 and determine whether an estimated bathymetric slope at a location exceeds a slope threshold. The bathymetric slope could be reported by the depth charts directly, or could be calculated using a linear fit of the nearest contour lines to the measurement location. If the slope threshold is exceeded, method 800 reverts to step 802 and the main controller 110 repeats the application of the location selection criteria at a different location. If the slope threshold is not exceeded, method 800 proceeds to step 808.

At step 808, the main controller 110 records water depth measurements during a variety of pitch and roll conditions. If a Kalman filter is utilized, a sampling and iterating process could be performed until state variances are below a desired threshold based on the desired accuracy of the estimate. For example, if a precision of 5 cm is desired, iterations could continue until the state estimate variance is less than 25 $cm^2$ per axis. At step 810, the main controller 110 utilizes the multitude of measurements to determine the longitudinal and/or lateral distance of the transducer 14 from the center of rotation 12 of the vessel 10. Since the pitch angle θ, the roll angle φ and the heave of the vessel 10 may be determined by the IMU 130, for small angles of pitch and roll the following equation may be utilized:

$$d_{0,0}-d_{\theta,\varphi}=d_{ion}\theta+d_{lat\varphi}+d_{heave}$$

where $d_{0,0}$ is the depth measurement of the transducer 14 where pitch angle θ is zero, the roll angle q is zero, and the heave of the vessel 10 is zero, and dog is the depth measurement of the transducer 14 with a nonzero pitch angle θ measured in radians, and a nonzero roll angle φ measured in radians. By using the above equation and multiple measurements, estimates of $d_{ion}$ (i.e., distance 22, see FIG. 1) and $d_{lat}$ (i.e., distance 24, see FIG. 1) may be determined, for example, using multiple regression analysis, or Kalman filters or Particle filters to estimate the regression coefficients. $d_{heave}$ of the marine vessel 10 is estimated using one or more measurement units included in the navigation system 100 (e.g., IMU 130, GNSS 140, AHRS, INS). Once $d_{ion}$ and $d_{lat}$ have been estimated using the techniques described above, they may be utilized in method 700 (see FIG. 7) to determine a chart error correction value for the depth chart displayed to an operator.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A navigation system for a marine vessel, comprising:

a locating system configured to locate a global position of a center of rotation of the marine vessel;

a transducer configured to sense at least one water depth measurement below the marine vessel, wherein the transducer is positioned at least one of a longitudinal transducer distance and a lateral transducer distance from the center of rotation; and one or more controllers configured to:

receive the at least one water depth measurement from the transducer;

determine an adjusted transducer position of the transducer relative to the center of rotation based on the at least one of the longitudinal transducer distance and the lateral transducer distance, and at least one of pitch or roll movements of the marine vessel;

correct the at least one water depth measurement from the transducer based on the at least one of the pitch or roll movements of the marine vessel; and determine a chart error correction value for a depth chart based on the adjusted transducer position and the at least one corrected water depth measurement.

2. The navigation system of claim 1, wherein the one or more controllers are further configured to locate the transducer to determine the at least one of the longitudinal transducer distance and the lateral transducer distance.

3. The navigation system of claim 2, wherein locating the transducer includes:

determining that a measurement location below the marine vessel fulfills at least one location selection condition;

receiving a plurality of water depth measurements at the measurement location from the transducer during at least one of pitch or roll movements of the marine vessel; and determining the at least one of the longitudinal transducer distance and the lateral transducer distance based on the plurality of water depth measurements at the measurement location.

4. The navigation system of claim 3, wherein the at least one location selection condition comprises a ratio of a beam measurement area diameter to a depth contour spacing of the depth chart not exceeding a ratio threshold.

5. The navigation system of claim 3, wherein the at least one location selection condition comprises a bathymetric slope estimate at the measurement location not exceeding a slope threshold.

6. The navigation system of claim 1, wherein the one or more controllers are further configured to correct the at least one water depth measurement from the transducer based on heave movements of the marine vessel.

7. The navigation system of claim 1, wherein the one or more controllers are configured to reject the at least one water depth measurement from the transducer based on a determination that a measurement location below the marine vessel does not fulfill at least one location selection condition.

8. The navigation system of claim 7, wherein the at least one location selection condition comprises a ratio of a beam measurement area diameter to a depth contour spacing of the depth chart not exceeding a ratio threshold.

9. The navigation system of claim 7, wherein the at least one location selection condition comprises a bathymetric slope estimate at the measurement location not exceeding a slope threshold.

10. The navigation system of claim 1, wherein the transducer is a narrow beam sonar transducer or a side imaging sonar transducer.

11. A method for error correcting a depth chart used for navigation of a marine vessel, comprising:

receiving at least one water depth measurement from a transducer, wherein the transducer is positioned at least one of a longitudinal transducer distance and a lateral transducer distance from a center of rotation of the marine vessel;

determining an adjusted transducer position of the transducer relative to the center of rotation based on the at least one of the longitudinal transducer distance and the lateral transducer distance, and at least one of pitch or roll movements of the marine vessel;

correcting the at least one water depth measurement from the transducer based on the at least one of the pitch or roll movements of the marine vessel; and determining a chart error correction value based on the adjusted transducer position and the at least one corrected water depth measurement.

12. The method of claim 11, wherein the method further comprises locating the transducer to determine the at least one of the longitudinal transducer distance and the lateral transducer distance.

13. The method of claim 12, wherein locating the transducer includes:

determining that a measurement location below the marine vessel fulfills at least one location selection condition;

receiving a plurality of water depth measurements at the measurement location from the transducer during at least one of pitch or roll movements of the marine vessel; and determining the at least one of the longitudinal transducer distance and the lateral transducer distance based on the plurality of water depth measurements at the measurement location.

14. The method of claim 13, wherein the at least one location selection condition comprises a ratio of a beam measurement area diameter to a depth contour spacing of the depth chart not exceeding a ratio threshold.

15. The method of claim 13, wherein the at least one location selection condition comprises a bathymetric slope estimate at the measurement location not exceeding a slope threshold.

16. The method of claim 11, wherein the method further comprises correcting at least one water depth measurement from the transducer based on heave movements of the marine vessel.

17. The method of claim 11, wherein the method further comprises rejecting the at least one water depth measurement from the transducer based on a determination that a measurement location below the marine vessel does not fulfill at least one location selection condition.

18. The method of claim 17, wherein the at least one location selection condition comprises a ratio of a beam measurement area diameter to a depth contour spacing of the depth chart not exceeding a ratio threshold.

19. The method of claim 17, wherein the at least one location selection condition comprises a bathymetric slope estimate at the measurement location not exceeding a slope threshold.

20. The method of claim 11, wherein the transducer is a narrow beam sonar transducer or a side imaging sonar transducer.

* * * * *